US005206666A

United States Patent [19]

Watanabe et al.

[11] Patent Number: 5,206,666

[45] Date of Patent: Apr. 27, 1993

[54] INK JET RECORDING APPARATUS

[75] Inventors: Fumihiko Watanabe; Takeshi Ono, both of Yokohama, Japan

[73] Assignee: Canon Kabushiki Kaisha, Tokyo, Japan

[21] Appl. No.: 617,365

[22] Filed: Nov. 23, 1990

[30] Foreign Application Priority Data

Nov. 22, 1989 [JP] Japan .................................. 1-304069
Dec. 7, 1989 [JP] Japan .................................. 1-318599

[51] Int. Cl.[5] .......................... B41J 2/01; B41J 2/165; H04N 1/034

[52] U.S. Cl. ................................. 346/140 R; 358/296

[58] Field of Search .................. 346/134, 136, 140 R; 358/296

[56] References Cited

U.S. PATENT DOCUMENTS

| | | | |
|---|---|---|---|
| 3,839,721 | 10/1974 | Chen et al. | 346/140 R |
| 4,313,124 | 1/1982 | Hara | 346/140 R |
| 4,333,088 | 6/1982 | Diggins | 346/140 R |
| 4,345,262 | 8/1982 | Shirato et al. | 346/140 R |
| 4,432,004 | 2/1984 | Glattli | 346/140 R |
| 4,459,600 | 7/1984 | Sato et al. | 346/140 R |
| 4,463,359 | 7/1984 | Ayata et al. | 346/1.1 |
| 4,491,854 | 1/1985 | Habelt et al. | 346/136 |
| 4,514,740 | 4/1985 | Fujiwara et al. | 346/136 |
| 4,558,333 | 12/1985 | Sugitani et al. | 346/140 R |
| 4,577,203 | 3/1986 | Kawamura | 346/140 R |
| 4,723,129 | 2/1988 | Endo et al. | 346/1.1 |
| 4,731,639 | 3/1988 | Gutmann et al. | 355/64 |
| 4,740,796 | 4/1988 | Endo et al. | 346/1.1 |
| 4,789,900 | 12/1988 | Takahashi | 358/449 X |
| 4,855,764 | 8/1989 | Humbs et al. | 346/140 R |

FOREIGN PATENT DOCUMENTS

| | | | |
|---|---|---|---|
| 54-40638 | 3/1979 | Japan . | |
| 54-56847 | 5/1979 | Japan . | |
| 0058875 | 5/1981 | Japan | 346/140 PD |
| 57-120476 | 7/1982 | Japan . | |
| 58-63462 | 4/1983 | Japan . | |
| 59-123670 | 7/1984 | Japan . | |
| 59-138461 | 8/1984 | Japan . | |
| 60-24975 | 2/1985 | Japan . | |
| 60-71260 | 4/1985 | Japan . | |
| 0224550 | 11/1985 | Japan | 346/140 PD |
| 62-244644 | 10/1987 | Japan . | |
| 1-180352 | 7/1989 | Japan . | |

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

An ink jet recording apparatus includes a full-line type recording head having plural ejection outlets; a shaft for rotatably supporting the recording head between a recording position in which the ink is ejected in a non-vertical direction and a non-recording position in which the ink is ejected substantially vertically; a device, disposed adjacent a recording position of the recording head, contributable to feeding of the recording material; and a positioning plate press-contacted to the contributable device to confine a recording surface of the recording material in cooperation with the contributable device.

20 Claims, 7 Drawing Sheets

INK JET RECORDING APPARATUS

FIELD OF THE INVENTION AND RELATED ART

The present invention relates to an ink jet recording apparatus using a recording head, particularly, a so-called full-line type recording head which has plural ink ejection outlets covering an entire recording medium width.

Recording machines are classified depending on the recording method into an ink jet type, a wire dot type, a thermal type and a laser beam type, for example. In a recording apparatus such as a printer, a copying machine or a facsimile machine of these types, a desired image is recorded on a recording material in the form of a thin sheet of paper or plastic material in accordance with information supplied thereto. In the ink jet recording type apparatus, droplets of ink are ejected through ejection outlets of the recording head and are deposited onto the recording material so as to effect recording of the images.

Particularly, in the system wherein droplets of ink are is ejected by pressure caused by film boiling of the ink resulting from the thermal energy, the ink passages including heat generating resistors can be produced using a film forming technique, and therefore, the system is most suitable for high density, and therefore, high speed recording.

Referring to FIG. 1, there is shown in a perspective view a line recording head used in the ink jet recording apparatus. The recording head 17 is generally comprised of a main body 17*a* containing heat generating portions, electric parts and ink chamber made of glass, a first filter 30*a* and a second filter 30*b*, and a front plate 31, which are disposed outside the main body. The first and second filters 30*a* and 30*b* have first and second connectors 32*a* and 32*b* and are connected with an ink supplier through ink supply tubes with hermetical seal. Chain line 7 is a line connecting centers of ejection outlets. As will be understood, an image can be formed over an entire width of the recording material by the scan in the major scanning direction, by the ejection outlets 7*a*. The ejection outlets have several microns diameters and are in communication with the ink supply tube by way of ink passages and ink supply chambers. Here, the other ends of the ink supply tube are connected with unshown first and second supply pipes. The head front plate 31 is made of metal or molded plastic resin material. Between the ejection outlet side surface 7*a* and the front plate 31, silicone rubber or the like establishes hermetical seal. The first and second filters 30*a* and 30*b* function to prevent foreign matters from being introduced into the nozzles.

First and second head arms 33*a* and 33*b* are fixed on a head shaft 18 by screws or the like, so that the head shaft 18 and the head 17 are fixed to each other. The head shaft 34 is rotatably supported on an unshown main frame by way of bearings. The head shaft 18 is connected with a driving system constituted by gears and belts KB or the like, and is further connected to a stepping motor KM.

In the ink jet recording head, the ink ejection may become improper with the result of degraded image recording, because of evaporation of the ink through the ejection outlet, drying of the ink in the ejection outlet side surface, leakage of the ink through the ejection outlets, deposition of foreign matters on the ejection side surface and resulting contamination, or unnecessary bubble formation in the head at the ink supply passages 35*a* and 35*b*, at the common chamber or the like.

In order to avoid the improper ejection, recording head recovery operation is carried out during the recording operation or not during the recording operation. The recovery operation includes idle ejection of the ink not contributable to the recording through the ejection outlets of the recording head, pressurizing or sucking the ink while capping the ejection side surface with a capping member. It is noted that the capping member is bulky to cover the entire ejection side surface of the full-line type head. The mechanism for moving the cap is complicated. Accordingly, if the recording head of this type is incorporated in a wordprocessor or facsimile machine, the size of the apparatus becomes large, which is not desirable in commercial machines.

Additionally, in the ink jet recording apparatus, it is desirable to stably and accurately maintain a small clearance between the ejection side surface 7*a* of the recording head 17 and the recording material. FIG. 2 shows the usual structure of the recording material conveying system in the neighborhood of the recording position. Conveying rollers 115 are driven by an unshown driving means such as motor. A recording material 1 is in the form of a thin sheet of paper or plastic resin material supplied in a direction indicated by an arrow F. A follower roller 114 is urged to the conveying roller 115 through the recording material 1. A recording material guide 110 confines the passage of the recording material in the recording position. A sheet discharging roller 111 is driven in synchronism with the conveying roller 115. A follower roller 112 is urged to the sheet discharging roller 111 through the recording material 1.

In the recording position between the conveying roller 115 and the discharging roller 111, there is disposed the full-line type recording head 17 facing the recording material guide 110. During the recording operation, the discharging roller 111 is rotationally driven at a speed slightly higher than that of the conveying roller 115. Thus, the recording material 1 is conveyed while it is being stretched between the conveying roller 115 and the discharging roller 111 and while the predetermined clearance being maintained between the recording head 17 and the ejection side surface 7*a*. With this state, an image constituted by dot pattern is recorded by droplets of ink ejected from the ejection outlets 7.

However, in such an ink jet recording apparatus, when a leading edge of the recording material 1 passes through the recording position, more particularly, the position where it faces the ejection side surface 7*a* of the recording head, the movement of the recording material is not stabilized in its movement direction, or the leading edge portion of the recording material is raised. Then, the recording material is easily contacted to the ejection side surface 7*a*. If this occurs, it becomes difficult to maintain the predetermined clearance between the recording material and the ejection side surface 7*a*. It would be considered that the recording head is retracted when the leading edge of the recording material comes to the recording head. However, it would result in complicated and bulky structure of the apparatus. In addition, provision of particular sequential control system therefor would result in slower recording operation.

SUMMARY OF THE INVENTION

Accordingly, it is a principal object of the present invention to provide an ink jet recording apparatus in which the structure of the recovery mechanism such as capping means is small in size.

It is another object of the present invention to provide an ink jet recording apparatus wherein the capping operation is effected in association with operation of the recording head and wherein adverse affect by the ink droplets scattered can be suppressed.

It is a further object of the present invention to provide an ink jet recording apparatus wherein the rising of the leading edge of the recording material is prevented.

It is further object of the present invention to provide an ink jet recording apparatus wherein the movement of the recording material is stabilized in the recording position.

It is a further object of the present invention to provide an ink jet recording apparatus wherein the small clearance can be maintained with high accuracy at all times between the ejection side surface 7*a* and the recording material 1 without using particular structure or sequential control system.

In an aspect of the present invention, there is provided an ink jet recording apparatus, comprising:

a full-line type recording head having plural ejection outlets; a shaft for rotatably supporting said recording head between a recording position in which the ink is ejected in a non-vertical direction and a non-recording position in which the ink is ejected substantially vertically; means, disposed adjacent a recording position of said recording head, contributable to feeding of the recording material; and a positioning member in the form of a plate press-contacted to the contributable means to confine the recording material in cooperation with the contributable means to confine a recording surface of the recording material.

In another aspect of the present invention, there is provided an ink jet recording apparatus, comprising: a full-line type recording head having plural ejection outlets; a tray below said recording head, said tray being provided with a cleaning member for cleaning an ejection outlet side surface of the recording head and a capping mean for capping the ejection side surface, in a movement path of the recording head between the recording position and the non-recording position; and a passage for the recording material below said tray after the recording material is subjected to the recording operation.

In a further aspect of the present invention, there is provided an ink jet recording apparatus, comprising: a full-line type recording head having plural ink ejection outlets; a feeding roller, disposed adjacent a recording position of said recording head, contributable to feeding a recording material; a positioning member in the form of a plate press-contacted to said feeding roller, to cooperate with said feeding roller to confine a recording surface of the recording material, wherein the recording position is adjacent an edge of said positioning member.

According to an aspect of the present invention, the necessity for the driving means for the capping means is eliminated, and the movable range of the capping means can be reduced, so that the size of the recovery mechanism can be reduced with the reduction of cost.

According to another aspect of the present invention, the recovery operation of the recording head is carried out in association with rotation of the recording head, and therefore, the recovery operation can be performed with a simple motion and in a short period of time.

According to a further aspect of the present invention, the liability of the ink leakage through the head and the contamination of the recording material or in the apparatus can be significantly decreased.

According to a further aspect of the present invention, residual ink can be easily collected.

According to a further aspect of the present invention, the movement of the recording material or sheet can be stabilized at a predetermined correct position, and therefore, the clearance between the ejection side surface and the recording sheet can be selected to be smaller, and the necessity for the provision of significant top and bottom margins on the recording material can be eliminated.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 3:
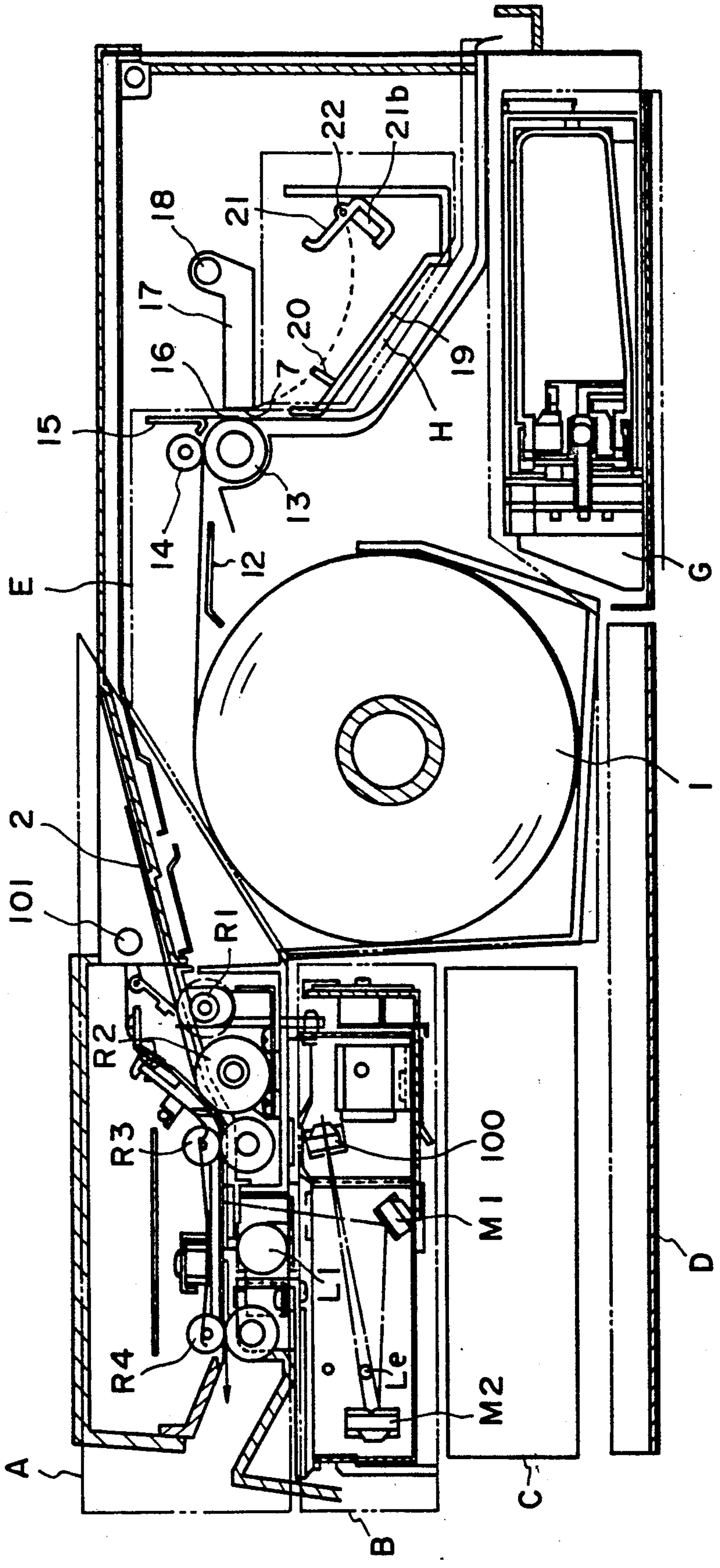
FIG. 3 is a longitudinal sectional view of an ink jet recording apparatus according to an embodiment of the present invention.

Referring to FIG. 3, there is shown a facsimile machine as an exemplary image forming apparatus according to an embodiment of the present invention. The facsimile machine according to this embodiment is comprised of an original conveying system A, an optical system B, a power source C, an electrocircuit board D, a recording sheet conveying system E, a supplying system G and a recovery system H. Here, the original conveying system A and an optical system B constitute an original reader for reading an image of the original When an original 2 is set for the purpose of transmission or copy, the rollers R1, R2, R3 and R4 driven by an unshown driving means are driven to feed the original 2 to read it. The image on the line of the original at the original reading line (main scanning line) which is predetermined is read by an optical system B (lamp L1, mirrors M1 and M2) using a line CCD 100 through a reflection optical path and through a condenser lens Le. The image is converted to an electric signal, so that the information of the original is read. Upon image reception or copying operation, the recording sheet conveying system E feeds by the rollers driven by an unshown driving means along the passage shown in the Figure from a rolled recording material (paper) 1. At the predetermined recording line, the ink is ejected through the ejection outlets 7 of the recording head by which an image is recorded. The ink ejection through the ejection outlets 7 of the recording head 17 is accomplished by thermal energy which is supplied by an electrothermal transducer of the recording head 17. The power source C usually receives AC power and converts the AC power to required voltages and currents and supplies them to the proper parts. The electric circuit comprising the electrocircuit board D has a microcomputer system as the main component and effects signal transfer among various parts of the apparatus and controls various parts of the apparatus. It also connects and disconnect the machine relative to the telephone line and controls the image information signals. The supply system G supplies the ink to the recording head. The recovery system H carries out the cleaning and capping operations for the ejection side surface of the recording head.

In FIG. 3, a reference numeral 12 designates a sheet guide for confining movement of the recording material (recording sheet) 1; and 13 is a sheet conveying roller driven by an unshown driving means. A roller 14 is press-contacted to the conveying roller 13 through the recording sheet 1 with a predetermined pressure upon operation to apply a conveying force to the recording sheet 1.

At the outlet side of the conveying roller 13 there is a sheet guide 15 having a contact guide 16. The contact guide 16 is made, for example, of a polyester sheet or the like and functions to urge the recording sheet 1 to the conveying roller 13 to confine the movement passage.

The leading portion of the contact guide 16, as shown in the Figure, extends beyond the contact thereof with the conveying roller 13 to confine the sheet conveyance passage in the neighborhood of the recording head 17.

The sheet guides 12 and 15, a roller 14 and a contact guide 16 are supported by an unshown cover member of the apparatus, and therefore, they are opened by opening the cover. The full-line type recording head 17 having the number of ejection outlets 7 to cover the entire recording width of the recording material, is rotatably supported on a rotational shaft 18 extending parallel with a surface of the recording sheet 1.

FIG. 3 shows the position (recording position) of the recording head during the recording operation.

The front side of the recording head 17 constitutes the ejection side surface 7a having the number of ejection outlets arranged laterally (in the direction of the lines of the record). On the basis of the information to be recorded, the ink droplets are ejected through the ejection outlets 7, so that an image is recorded on the recording sheet 1 moving in faced relation thereto.

The recording position of the line recording head 17 (recording line position) is set to the position slightly below the edge of the contact guide 16 at which the recording sheet is stably passed. By maintaining the constant interval between the ejection outlet side surface 7a and the recording sheet 1, the image quality is assured.

Figure 4:
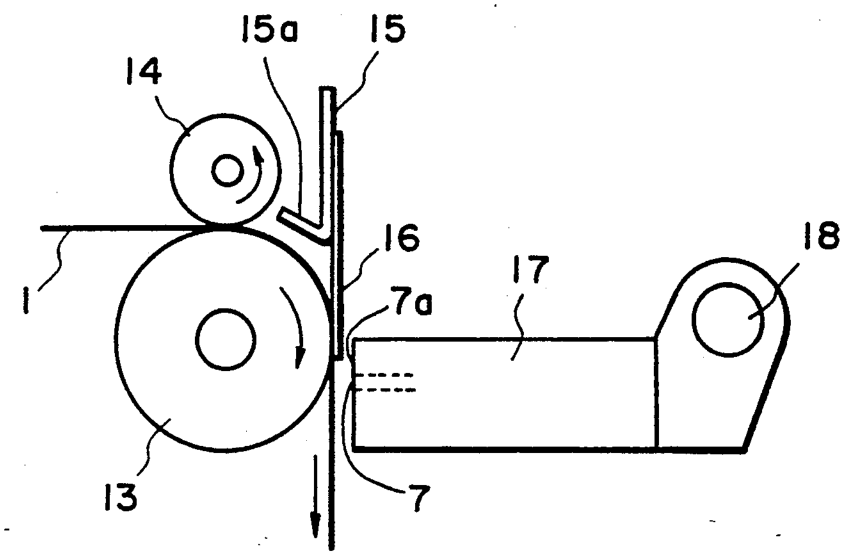
FIG. 4 is a side view of an example of a recording material conveyance system around the recording head of an ink jet recording apparatus according to an embodiment of the present invention.
Figure 5:
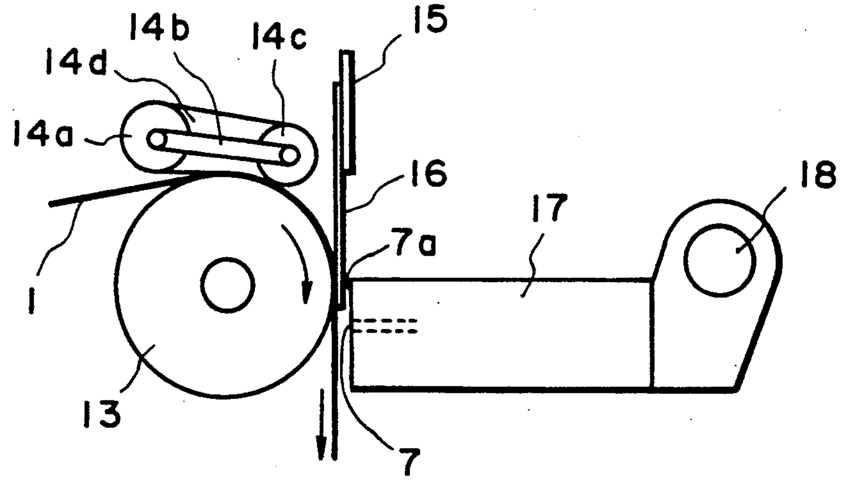
FIG. 5 is a side view of a recording material conveyance system around the recording head of an ink jet recording apparatus according to a further embodiment of the present invention.

Referring to FIGS. 4 and 5, the description will be made as to the structure of the conveying system in the neighborhood of the recording position. In FIG. 4, the conveying roller 13 is intermittently rotated at predetermined intervals by an unshown driving source (sheet feeding motor), so as to feed the recording sheet press-contacted to the periphery thereof.

The recording sheet 1 is urged by the follower roller 14 to the conveying roller 13 and is conveyed through friction by the conveying roller 13.

At a position downstream of the contact point between the conveying roller 13 and the follower roller 14 with respect to the movement direction of the sheet, there is a guide supporting member 15 to which a guide plate 16 made of thin elastic material extending in a direction of the width of the recording sheet 1 is mounted.

The guide supporting member 15 has guide 15a for guiding the recording sheet 1 coming through the contact between the conveying roller 13 and the follower roller 14.

The guiding plate 16 is urged to the conveying roller 13 by the resilient force through the recording sheet 1, and the reading portion thereof is extended to the urging position or to the position downstream of the urging position with respect to the sheet movement direction.

Adjacent the downstream side of the leading edge of the guide plate 16, the full-line type recording head 17 is disposed with a predetermined clearance from the recording sheet 1.

The surface of the recording head 17 adapted to be faced to the recording sheet 1 is provided with a number of ejection outlets 7. As described hereinbefore, the ejection outlets 7 are formed in the range covering the entire recording width (recording sheet width) to permit recording of one line at once.

Thus, the recording sheet is conveyed with confinement by the guide plate 16, and therefore, the clearance between the ejection side surface 7a of the recording head and the recording sheet 1 immediately after the guide plate 16, is stably maintained at a constant level at all times.

Therefore, by disposing the head with such a positional relation that the ejection outlets 7 of the recording head 17 are immediately downstream of the guide plate 16, the stabilized recording operation can be accomplished. More particularly, by the positional relation described above, the unstability of the recording sheet 1 conveyance and the rising of the leading edge of the recording sheet 1 and the resultant rubbing of the ejection side surface 7a with the recording sheet 1, can be suppressed.

Figure 1:
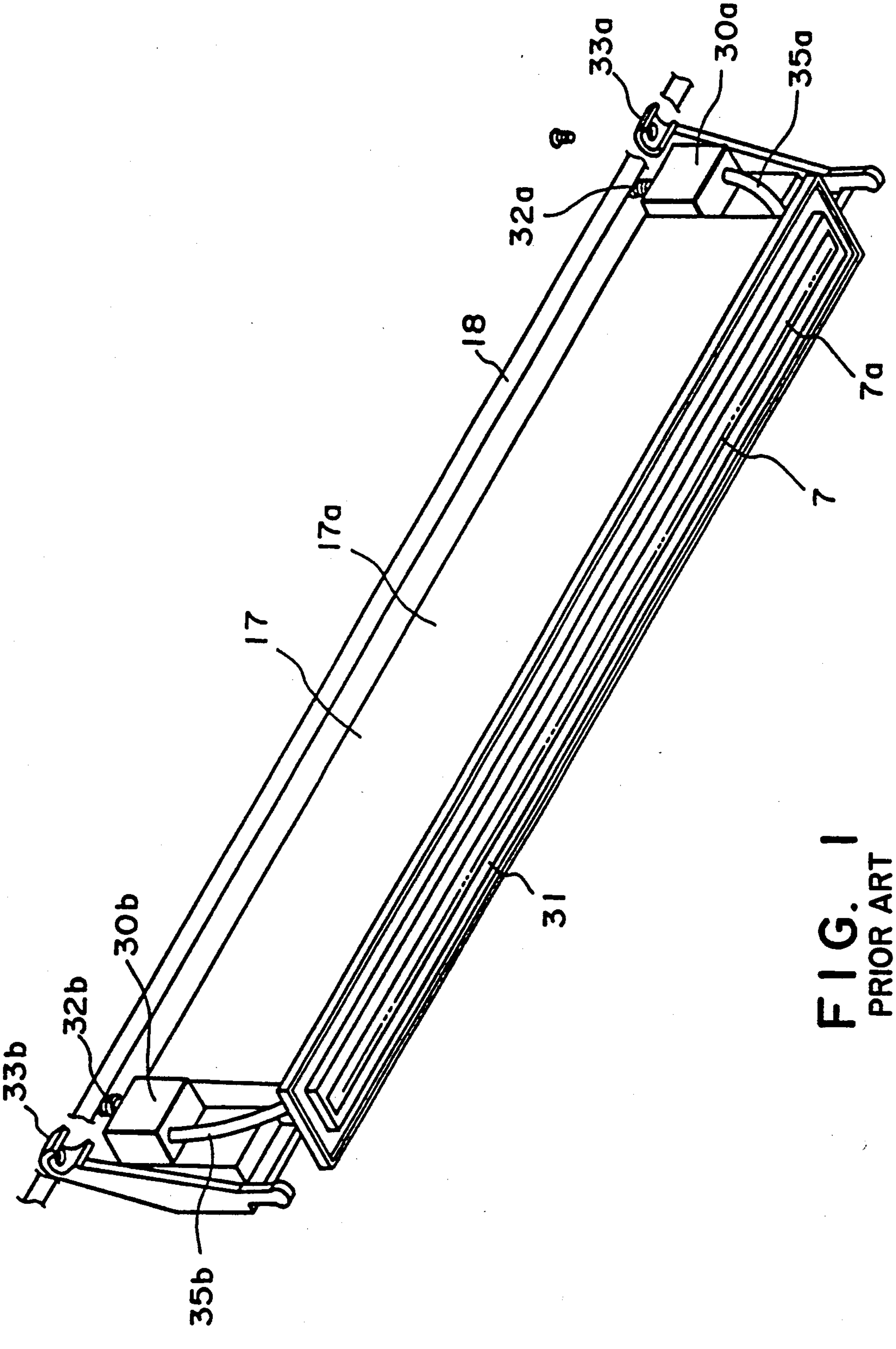
FIG. 1 PRIOR ART
FIG. 1 is a perspective view of an example of a full-line type recording head used in an ink jet recording apparatus.
Figure 2:
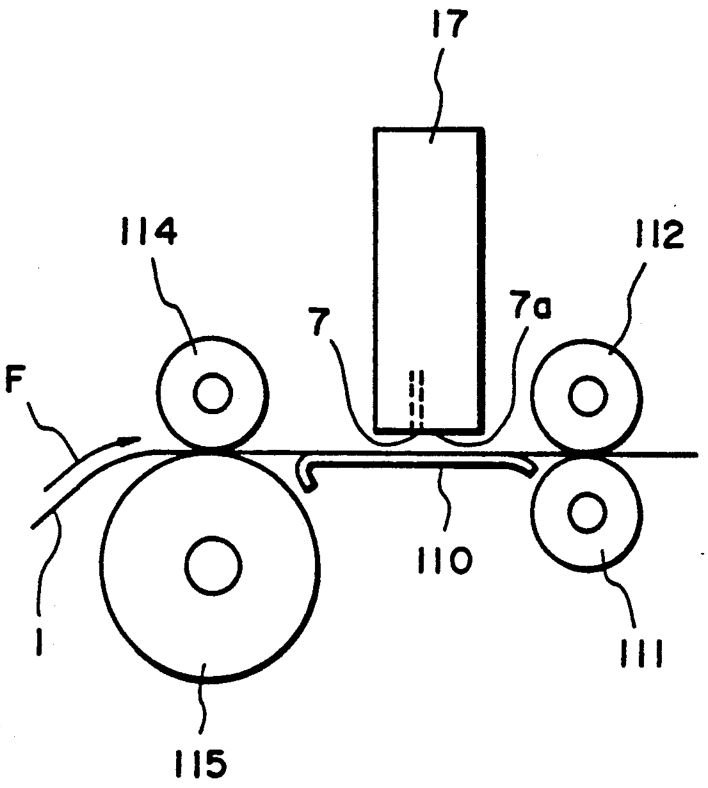
FIG. 2 PRIOR ART
FIG. 2 is a side view of a recording material conveyance system around the recording head in a conventional ink jet recording apparatus.

In this embodiment, the guide plate 16 is disposed downstream of the conveying roller 1, and is in resilient contact with the peripheral surface of the conveying roller 1, and extends to the position immediately before the recording line of the line recording head 17, and therefore, the following advantageous effects are provided:

1) The recording sheet can be stably fed along a predetermined path;

2) An accurate and small clearance such as 0.5±0.1 mm can be easily maintained between the recording head 17 and the recording sheet 2, so that a high density and high quality image can be produced at high speed;

3) A pair of sheet discharging rollers 111 and 112 (FIG. 2) necessitated in the conventional apparatus, can be eliminated, so that the structure and the number of parts of the conveying means can be reduced;

4) The pair of sheet discharging rollers 111 and 112 and the driving mechanism therefor can be omitted, so that the size of the recording apparatus can be reduced;

5) The structure around the recording head 6 can be simplified, and therefore, the latitude of design in the neighborhood of the recording line can be increased;

6) The pair of discharging rollers 111 and 112 can be omitted, and therefore, it is possible to effect recording on the recording sheet 1 immediately downstream of the edge of the guide plate 15, and therefore it becomes possible to significantly reduce or eliminate the top and bottom margins required on the recording sheet 1;

7) The feeding force can be sufficiently provided by means of the guide plate 5 not only for the continuous paper but also for cut sheets, and therefore, the above advantageous effects can be enjoyed by either recording material, so that the stabilized sheet feed and discharge are assured for either recording material.

FIG. 5 shows an ink jet recording apparatus according to another embodiment of the present invention. In this embodiment, in place of the follower roller 14 of FIG. 4, a sheet urging means is used. The sheet urging means comprises a fixed roller 14*a*, a link 14*b*, a follower roller 14*c* supported at an end of the link 14*b* and a belt 14*d* stretched between the fixed roller 14*a* and the follower roller 14*c* with a predetermined tension.

The link 14*b* is rotatable about an axis of the stationary roller 14*a*, and is urged in the clockwise direction in FIG. 5 by resilient force provided by a spring or the like.

According to this embodiment, in place of the guide support 15 of FIG. 4, a guide supporting member 15 is usable which does not have the guiding portion 15*a* of FIG. 4 and which is simply mounted vertically at a position downstream of the follower roller 14*c* with respect to the conveyance direction.

There is a difference between FIGS. 4 and 5 arrangements in the position of the guide support 15. However, the guide support 15 of FIG. 5 may be disposed to the roller 13 side not to the recording head side.

In the foregoing embodiments, the materials of the conveying roller 13, the follower rollers 14, 14*c*, the belt 14*d* and the guide plate 16 or the like may be metal, plastic resin material or rubber if the above-described functions thereof can be performed.

The configurations of these elements may be properly determined by one skilled in the art if the conveying path of the recording sheet 1 at the recording position can be properly maintained.

Below the recording head 17, an ink receptor 19 is disposed to receive the residual ink from the recording head 17. The ink receptor 19 extends to cover the recording length of the recording head 17 so as to receive the ink leaked through any ejection outlets.

The ink receptor 19 is provided with a wiping means (cleaning member) 20 which contacts, upon the rotation of the recording head 17, to the ejection side surface 7*a* of the recording head 17 to remove the deposited ink or foreign matter.

The wiping means 20 is disposed in the path of the recording head 17 rotating about the shaft 18, so that it contacts the ejection side surface of the recording head upon the rotation of the recording head 17 to remove the ink and the foreign matter from the ejection side surface 7*a*. In this embodiment, it is made of rubber.

A cap 21 is rotatably supported on the ink receptor 19 about a shaft 22. The cap 21 functions to hermetically seal the ejection side surface 7*a* of the recording head 17, and therefore, it constitutes a capping means.

Figure 6:
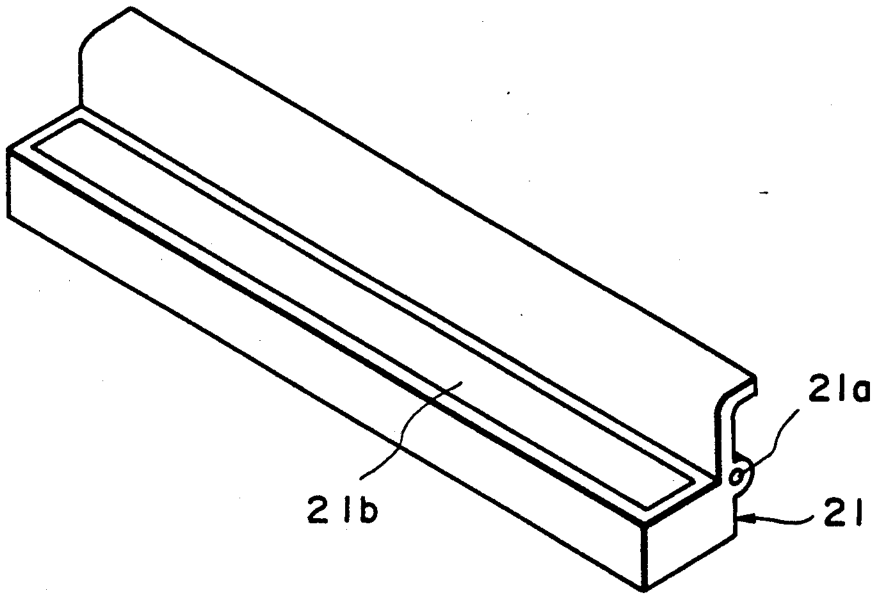
FIG. 6 is a perspective view of the cap shown in FIG. 3.

FIG. 6 is a perspective view of a cap 21 of FIG. 3. In FIGS. 3 and 6, the cap 21 is provided with holes 21*a* at its opposite sides to receive rotational shafts 22 from the opposite sides of the ink receptor 19, so that the cap 21 is rotatable relative to the ink receptor 19.

In the cap 21, there is sealing material 21*b* made of elastic material such as rubber, and therefore, the recording head 17 is capped when the sealing material 21*b* is press-contacted to the ejection side surface 7*a*.

When the recording head 17 rotates from its recording position (FIG. 3) to its rest position (FIG. 8), a part of the cap 21 is contacted to the side surface of the head 17 in the middle of the rotation stroke (FIG. 7), and the cap 21 rotates about the shaft 22 together with the rotation of the recording head 17. When the rest position (FIG. 8) is reached, the ejection side surface 7*a* of the recording head 17 and the sealing material 21*b* are contacted to seal the ejection side surface 7*a*.

In the movement path of the recording head 17 and downstream of the recording head 17, the ink receptor 19, the wiping means contactable to the ejection side surface 7*a* and the cap 21 for sealing the ejection side surface 7*a* are disposed.

The ink receptor 19 is so disposed that within the movable range of the recording head 17, it receives the ink leaked or ejected through the ejection outlets 7, except for the recording position (FIG. 3).

Since the ink receptor 19 is disposed below the head and at the upper region of the recording material 1 conveying region, the ink does not fall even if the ink leaks through the ejection outlets, and therefore good recording operation can be accomplished.

Figure 7:
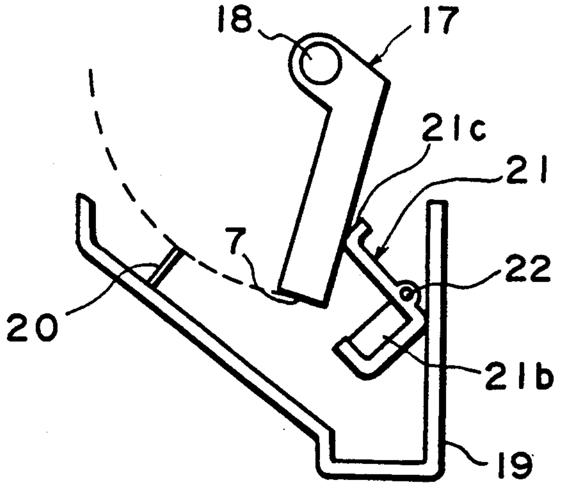
FIGS. 7 and 8 are partial longitudinal sectional views wherein the recording head is at the contact starting position with the cap and at the capping position, respectively.
Figure 8:
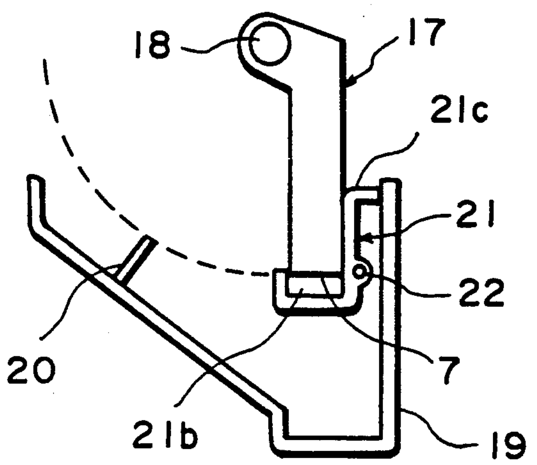

FIGS. 7 and 8 illustrate movement of the recording head of the ink jet recording apparatus described hereinbefore. FIG. 7 shows the recording head to which the cap 21 starts to contact, and FIG. 8 shows the recording head 17 covered with the cap 21 in which the recording head is in hermetical contact with the sealing member 21*b* at the rest position thereof.

In operation, ejection energy generating elements are selectively driven for each line on the basis of the record data supplied from host apparatus or the like, so that the ink droplets are ejected through the selected ejection outlets. The droplets are deposited on the recording sheet 1 to form an image.

On the other hand, the recording sheet 1 is fed intermittently at predetermined intervals by the feeding roller 13 in synchronism with the line recording actions.

Upon completion of the recording operation, or when improper image formation is detected or observed during the recording operation, the ejection recovery operation is effected for the recording head. First, the recording head 17 is rotated from the recording position shown in FIG. 3 to the predetermined position in which the ejection side surface 7*a* is faced to the ink receptor 19 (in the counterclockwise direction in the Figure), so that predetermined amount of ink is ejected idly through the ejection outlets 7.

Upon completion of the idle ejection, the recording head 17 is rotated in the clockwise direction to set it to the recording position, and the recording operation is resumed.

Upon the rotation of the recording head 17, the ejection side surface 7*a* of the recording head 17 is moved in sliding contact with the wiping means 20, so that the residual ink or the foreign matter deposited on the ejection side surface 7 is wiped off, so that all ejection outlets are cleaned.

When the recording apparatus is kept rested thereafter, the recording head 17 is rotated in the counterclockwise direction from the recording position shown in FIG. 3, and the recording head 17 is contacted to an end 21*c* of the cap 21 at the middle position shown in FIG. 7, and is further rotated to the rest position shown in FIG. 8.

Together with the rotation of the recording head 17, the cap 21 is rotated about the rotational shaft 22 in the clockwise direction.

When the recording head 17 is rotated to the rest position shown in FIG. 8, the cap 21 rotates to the position where the inside sealing material 21*b* is press-contacted to the ejection side surface 7 of the recording head 17.

In this manner, both of the recording head 17 and the cap 21 are stopped at the rest position (FIG. 8). In this rest position, all of the ejection outlets of the ejection side surface 7 are hermetically sealed by the sealing member 21*b* of the cap 21, so that the capped state is maintained.

When the recording operation is removed, the recording head 17 is rotated in the clockwise direction. Then, the cap 21 releases the recording head 17. Then, the ink is ejected through the ejection outlets of the recording head 17 for the purpose of idle ejections.

Subsequently, when the recording head 17 is rotated to pass by the wiping means 20, the wiping means 20 removes the residual ink and the foreign matter from the ejection side surface 7*a*. Thereafter, the recording head 17 is set to the recording position (FIG. 3). Then, the recording head waits for the recording instructions.

Figure 9:
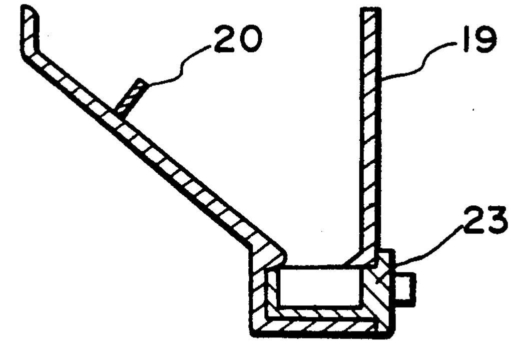
FIG. 9 is a longitudinal sectional view of another example of an ink receptor shown in FIG. 3.

FIG. 9 is a longitudinal sectional view of another example of the ink receptor. In FIG. 9, the ink receptor 19 has such a configuration as to collect the ink using the gravity, and the portion collecting the ink is constituted by a detachable member. More particularly, to the bottom of the ink receptor 19, a separate receptor 23 is detachably mounted. When the residual ink is received thereby, the receptor 23 is dismounted, so that the residual ink can be easily disposed of.

It is preferable that the ink receptor 23 contains ink absorbing material such as sponge or the like having a high absorbing property.

According to this embodiment of the present invention, the line recording head (ink jet head) 17 is rotatable about a shaft 18 extending in a longitudinal direction thereof, that is, in the direction parallel to the lines of the record, so that the recording head 17 can be accommodated in the recording apparatus without requiring large space. In addition, the recording head 17 can be moved up and down by a simple driving means.

Furthermore, in a rotational movement path of the recording head 17, the ink receptor 19, the wiping member 20 and the cap 21 are disposed in the order named from the recording position to the rest position. Therefore, utilizing the rotation of the recording head 17 in the non-recording period, the recording head 17 can be subjected to the capping and recovery operations. Therefore, the time required for the rotation can be reduced.

The ink receptor 19 can cover the entire rotational region of the recording head 17, except for the recording position, above the conveyance path of the recording material 1. Therefore, even if the ink drops from the recording head 17 or the like, substantially all of the ink can be received. Thus, the deposition of the leaked ink onto the recording material can be effectively prevented, and therefore, the good recording operation is possible.

Since the elements used for the recovery operation are substantially all disposed in the ink receptor 19, the recovery system can be simplified with small space required. In addition, the time required for the recovery operation can be further reduced, and the residual ink can be easily collected.

Figure 10:
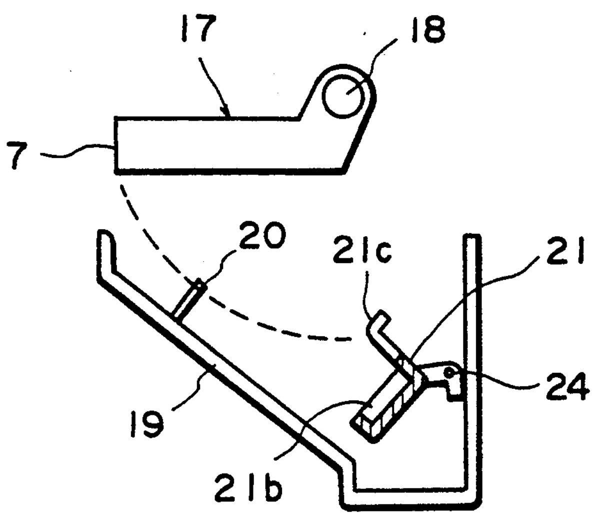
FIGS. 10 and 11 are partial longitudinal sectional views of another example of capping means when the recording head is as its recording position and at its rest position.
Figure 11:
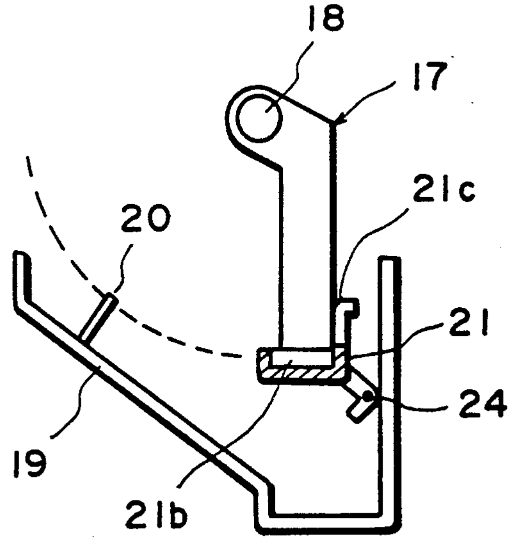

FIGS. 10 and 11 are longitudinal sectional views of major parts of the ink jet recording apparatus according to a further embodiment of the present invention. FIG. 10 shows a line recording head 17 set at its recording position, and FIG. 11 shows the line recording head 17 placed at its rest position with the capping operation completed.

As compared with the foregoing embodiment, the position of the rotational axis 24 of the cap 21 is different. The structure of this embodiment is the same as the foregoing embodiment in the other respects, and the operation and function are the same as in the foregoing embodiment, and therefore, the detailed description thereof are omitted for simplicity.

Similarly to the embodiments described in conjunction with FIGS. 3–9, the following advantageous effects can be provided:

1) The number of parts for the capping means 21 can be significantly reduced, and therefore, the reliability of the capping means can be improved;

2) Since the engagement and disengagement between the capping means 21 and the ejection outlets 7 are accomplished utilizing the movement of the recording head 17, and therefore, the necessity for the driving means exclusively for the capping means is eliminated, so that the cost can be reduced; and 3) The moving range of the capping means 21 can be reduced, and therefore, the size of the recording apparatus can be reduced.

As will be understood from the foregoing, the present invention provides an ink jet recording apparatus comprising recording sheet feeding means, a line recording head having plural ink ejection outlets, wherein the line recording head is rotatably supported about an axis parallel to the surface of the recording sheet between its recording position and it rest position, and wherein the recording head is rotatable by driving means such as motor. Therefore, the parts can be simplified and can be reduced in size. In addition, the time required for the recovery operation can be reduced.

In an embodiment, the cap for hermetically closing the ejection side surface of the recording head is rotatably supported, so that when the recording head rotates from its recording position to its rest position, it contacts the cap, and the cap hermetically seals the ejection side surface of the recording head at the rest position. Therefore, the necessity for the driving means for the capping means is eliminated, and the moving range of the capping means can be reduced. The size and the cost of the recovery mechanism can be reduced.

In an embodiment, recording position for effecting recording on the recording sheet, the ink receptor for receiving the ink, the wiping means for slidable contact with the ejection side surface and the cap for sealing the ejection outlets, are disposed in a movement path of the ejection side surface when the recording head is rotated. Therefore, the recovery operation for the recording head can be performed by the rotation of the recording head, so that the recovery operation can be accomplished by a simple motion in a short period of time.

In an embodiment, the ink receptor is so disposed that the leaked ink is received thereby in the movable range of the recording head, except for the recording position, and therefore, the adverse affect by the leaked ink can be significantly reduced.

In an embodiment, the wiping means and the cap are disposed in the ink receptor, and therefore, the size of the apparatus can be further reduced, and the time required for the recovery operation can be reduced.

In an embodiment, the ink receptor receives the ink using the gravity, and the ink collecting portion is detachably mountable. Therefore, the residual ink can be easily disposed of.

According to an aspect of the present invention, there is provided ink jet recording apparatus comprising a feeding roller driven by a driving source such as motor, a follower roller press-contacted to the feeding roller, a guide plate made of elastic thin plate disposed downstream of the press-contact position between the conveying roller and the follower roller with respect to the recording sheet conveyance direction, the guide plate being resiliently contacted to the feeding roller and extending to the contact position or the downstream of the contact position, wherein by driving the conveying roller, the recording sheet is conveyed between the feeding roller and the follower roller and in contact with the guide, and wherein the ink ejection recording position of the line recording head is disposed at the recording sheet passage position in the neighborhood of a downstream position of the downstream edge of the guide. Therefore, the position of the recording sheet in the recording position can be stabilized, so that the small clearance between the ejection side surface and the recording sheet can be maintained with precision, and therefore, a high quality image can be recorded.

The present invention is particularly suitably usable in a bubble jet recording head and recording apparatus developed by Canon Kabushiki Kaisha, Japan. This is because, the high density of the picture element, and the high resolution of the recording are possible.

The typical structures and the operational principles are preferably those disclosed in U.S. Pat. Nos. 4,723,129 and 4,740,796. The principle is applicable to a so-called on-demand type recording system and a continuous type recording system; however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provide by the electrothermal transducer to produce film boiling on the heating portion of the recording head, whereby a bubble can be formed in the liquid (ink) corresponding to each of the driving signals. By the development and collapse of the the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head or plural recording heads combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefor, pressing or suctions means, preliminary heating means by the ejection electrothermal transducer or by a combination of the ejection electrothermal transducer and additional heating element and means for preliminary ejection not for the recording operation, which can stabilize the recording operation.

As regards the kinds of the recording heads mountable, it may be a single head corresponding to a single color ink, or may be plural heads corresponding to the plurality of ink materials having different recording colors or densities. The present invention is effectively applicable to an apparatus having at least one of a monochromatic mode mainly with black and a multicolor mode with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in a usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material is solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions. The facsimile machine, discussed previously, includes a reader for reading an original, a transmitting circuit for emitting a signal in accordance with an output of the reader, a receiving circuit for receiving a signal sent thereto, and a recording signal generating circuit. The recording signal generating circuit controls the recording head in accordance with the signal received by the receiving circuit.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording apparatus, comprising:

a full-line type recording head having plural ejection outlets on a front side;

a shaft for rotatably supporting said recording head in a movement path between a recording position in which ink is ejected in a non-vertical direction onto a recording material and a non-recording position in which the ink is ejected substantially vertically;

a capping member, disposed adjacent the non-recording position, for covering the front side of said recording head, wherein during movement of said recording head from the recording position to the non-recording position, said capping member is moved by contact with a part of said recording head, and when the movement of said recording head to the non-recording position is completed, capping by said capping member is effected; and a tray disposed below said capping member and below the movement path of said recording head for receiving ink leaked from said recording head, wherein said tray is provided with a collector with an inclined surface for collecting the leaked ink, wherein said collector is detachably mounted to said tray.

2. An apparatus according to claim 1, wherein said recording head comprises electrothermal transducer elements for producing thermal energy to produce film boiling of the ink, which is contributable to eject the ink.

3. An apparatus according to claim 1, wherein said tray is exchangeable and is provided with an ink absorbing material.

4. An ink jet recording apparatus, comprising:

a full-line type recording head having plural ejection outlets on a front side;

a shaft for rotatably supporting said recording head in a movement path between a recording position in which ink is ejected in a non-vertical direction onto a recording material and a non-recording position in which the ink is ejected substantially vertically;

a capping member, disposed adjacent the non-recording position, for covering the front side of said recording head, wherein during movement of said recording head from the recording position to the non-recording position, said capping member is moved by contact with a part of said recording head, and when the movement of said recording head to the non-recording position is completed, capping by said capping member is effected; and a tray disposed below said capping member and below the movement path of said recording head for receiving ink leaked from said recording head, wherein a lower portion of said tray is used as a guide for movement of the recording material.

5. An apparatus according to claim 4, wherein said recording head comprises electrothermal transducer elements for producing thermal energy to produce film boiling of the ink, which is contributable to eject the ink.

6. An apparatus according to claim 4, wherein said tray is exchangeable and is provided with an ink absorbing material.

7. A facsimile machine comprising:

a full-line type recording head having plural ejection outlets on a front side;

a shaft for rotatably supporting said recording head in a movement path between a recording position in which ink is ejected in a non-vertical direction onto a recording material and a non-recording position in which the ink is ejected substantially vertically;

a capping member, disposed adjacent the non-recording position, for covering the front side of said recording head, wherein during movement of said recording head from the recording position to the non-recording position, said capping member is moved by contact with a part of said recording head, and when the movement of said recording head to the non-recording position is completed, capping by said capping member is effected;

a tray disposed below said capping member and below the movement path of said recording head for receiving ink leaked from said recording head, wherein a lower portion of said tray is used as a guide for movement of the recording material;

reading means for reading an original;

a circuit for emitting a signal in accordance with an output of said reading means;

a receiving circuit for receiving a signal sent thereto; and a recording signal generating circuit for controlling said recording head in accordance with the signal received by said receiving circuit.

8. A facsimile machine according to claim 7, wherein said recording head comprises electrothermal transducer elements for producing thermal energy to produce film boiling of the ink, which is contributable to eject the ink.

9. A facsimile machine according to claim 7, wherein said tray is exchangeable and is provided with an ink absorbing material.

10. A facsimile machine comprising:

a full-line type recording head having plural ejection outlets on an ejection side surface;

a shaft for rotatably supporting said recording head in a movement path between a recording position in which ink is ejected in a non-vertical direction onto a recording material and a non-recording position in which ink is ejected substantially vertically;

a cleaning blade for contacting the ejection side surface of said recording head, said cleaning blade provided in the movement path of said recording head to remove foreign matter from the ejection side surface of said recording head;

a tray disposed below said cleaning blade over a range of the movement path of said recording head, for receiving at least one of ink leaked from said recording head and ink from said cleaning blade, wherein the recording material is conveyed below said tray, after having been subjected to a recording operation by said recording head;

reading means for reading an original;

a circuit for emitting a signal in accordance with an output of said reading means;

a receiving circuit for receiving a signal sent thereto; and a recording signal generating circuit for controlling said recording head in accordance with the signal received by said receiving circuit.

11. A facsimile machine according to claim 10, wherein said recording head comprises electrothermal transducer elements for producing thermal energy to produce film boiling of the ink, which is contributable to eject the ink.

12. A facsimile machine according to claim 10, wherein said tray is exchangeable and is provided with an ink absorbing material.

13. An ink jet recording apparatus, comprising:

a full-line type recording head having plural ejection outlets on an ejection side surface;

a shaft for rotatably supporting said recording head in a movement path between a recording position in which ink is ejected in a non-vertical direction onto a recording material and a non-recording position in which ink is ejected substantially vertically;

a cleaning blade for contacting the ejection side surface of said recording head, said cleaning blade provided in the movement path of said recording head to remove foreign matter from the ejection side surface of said recording head; and a tray disposed below said cleaning blade over a range of the movement path of said recording head, for receiving at least one of ink leaked from said recording head and ink from said cleaning blade, wherein said tray has a tapered surface for directing received ink to a replaceable collecting portion.

14. An apparatus according to claim 13, wherein said recording head comprises electrothermal transducer elements for producing thermal energy to produce film boiling of the ink, which is contributable to eject the ink.

15. An apparatus according to claim 13, wherein said tray is exchangeable and is provided with an ink absorbing material.

16. An ink jet recording apparatus, comprising:

a full-line type recording head having plural ejection outlets on an ejection side surface;

a shaft for rotatably supporting said recording head in a movement path between a recording position in which ink is ejected in a non-vertical direction onto a recording material and a non-recording position in which ink is ejected substantially vertically;

a cleaning blade for contacting the ejection side surface of said recording head, said cleaning blade provided in the movement path of said recording head to remove foreign matter from the ejection side surface of said recording head; and a tray disposed below said cleaning blade over a range of the movement path of said recording head, for receiving at least one of ink leaked from said recording head and ink from said cleaning blade, wherein the recording material is conveyed below said tray, after having been subjected to a recording operation by said recording head.

17. An apparatus according to claim 16, wherein said recording head comprises electrothermal transducer elements for producing thermal energy to produce film boiling of the ink, which is contributable to eject the ink.

18. An apparatus according to claim 16, wherein said tray is exchangeable and is provided with an ink absorbing material.

19. A maintenance apparatus for an ink jet recording apparatus, said recording apparatus having a recording head with an ejection side surface and a shaft for rotatably supporting said recording head in a movement path between a recording position in which ink is ejected in a non-vertical direction onto a recording material and a non-recording position in which the ink is ejected substantially vertically, said maintenance apparatus comprising:

a capping member, disposed adjacent the non-recording position, for covering the ejection side surface of said recording head, wherein during movement of said recording head from the recording position to the non-recording position, said capping member is moved by contact with a part of said recording head, and when the movement of said recording head to the non-recording position is completed, capping by said capping member is effected;

a cleaning blade for contacting the ejection side surface of said recording head in the movement path of said recording head to remove foreign matter from the ejection side surface of said recording head; and a tray, disposed below said cleaning blade and said capping member over a range of the movement path of said recording head, for receiving at least one of ink leaked from said recording head and ink from said cleaning blade, wherein a lower portion of said tray is used as a guide for movement of the recording material.

20. An apparatus according to claim 19, wherein said tray is exchangeable and is provided with an ink absorbing material.

* * * * *

UNITED STATES PATENT AND TRADEMARK OFFICE
CERTIFICATE OF CORRECTION

PATENT NO. : 5,206,666

DATED : April 27, 1993

INVENTOR(S) : Fumihiko WATANABE, et al.

It is certified that error appears in the above-identified patent and that said Letters Patent is hereby corrected as shown below:

COLUMN 3:

Line 12, "affect" should read --effect--;

Line 47, "mean" should read --means--.

COLUMN 4:

Line 54, "as" should read --at--;

Line 68, "original" (second occurrrence) should read --original --.

COLUMN 7:

Line 68, "to" should be deleted.

COLUMN 8:

Line 24, "is contacted to" should read --contacts--.

UNITED STATES PATENT AND TRADEMARK OFFICE
CERTIFICATE OF CORRECTION

PATENT NO. : 5,206,666 Page 2 of 2

DATED : April 27, 1993

INVENTOR(S) : Fumihiko WATANABE, et al.

It is certified that error appears in the above-identified patent and that said Letters Patent is hereby corrected as shown below:

COLUMN 11:

Line 52, "because," should read --because--; and "element," should read --element--;

Line 58, "system; however," should read --system. However,--;

Line 65, "provide" should read --provided--.

COLUMN 12:

Line 26, "because," should read --because--.

Signed and Sealed this

Third Day of May, 1994

Attest:

Bruce Lehman

BRUCE LEHMAN

Attesting Officer

Commissioner of Patents and Trademarks